Jan. 31, 1961    H. W. CHRISTENSON ET AL    2,969,695
TRANSMISSION
Filed July 1, 1958    4 Sheets-Sheet 1

INVENTORS
Howard W. Christenson,
Mark E. Fisher, &
Ulysses A. Breting
BY W. C. Middleton
ATTORNEY

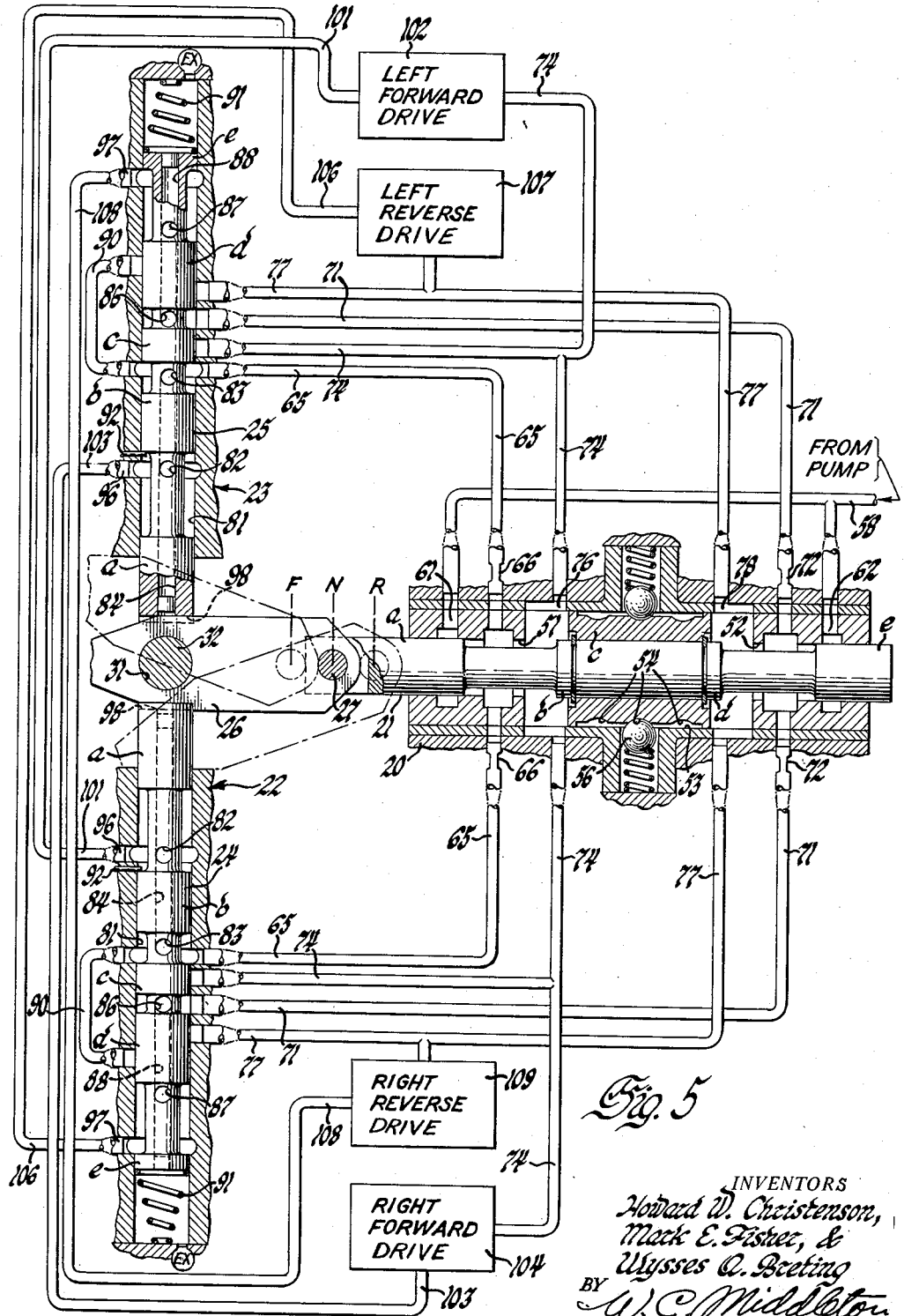

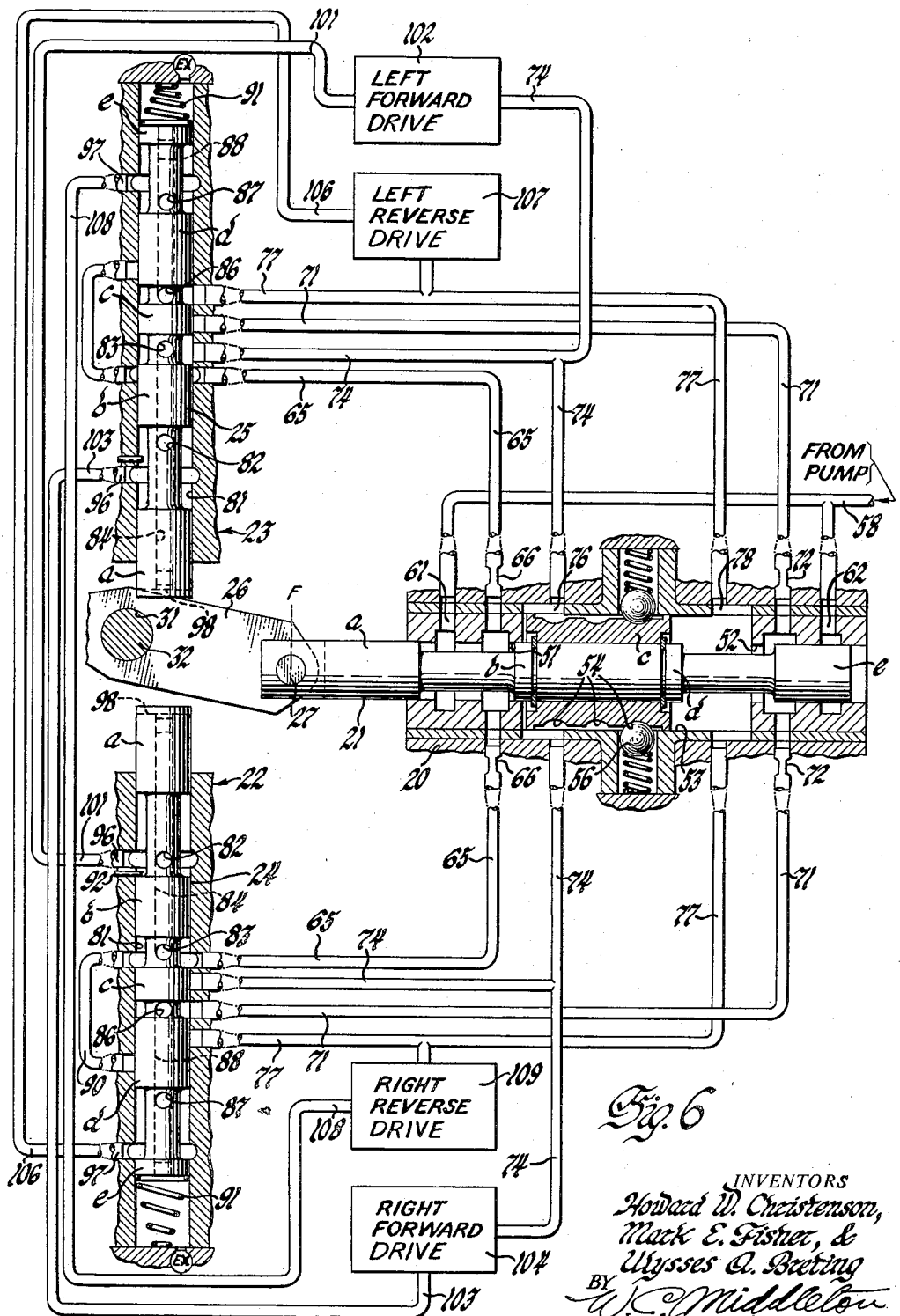

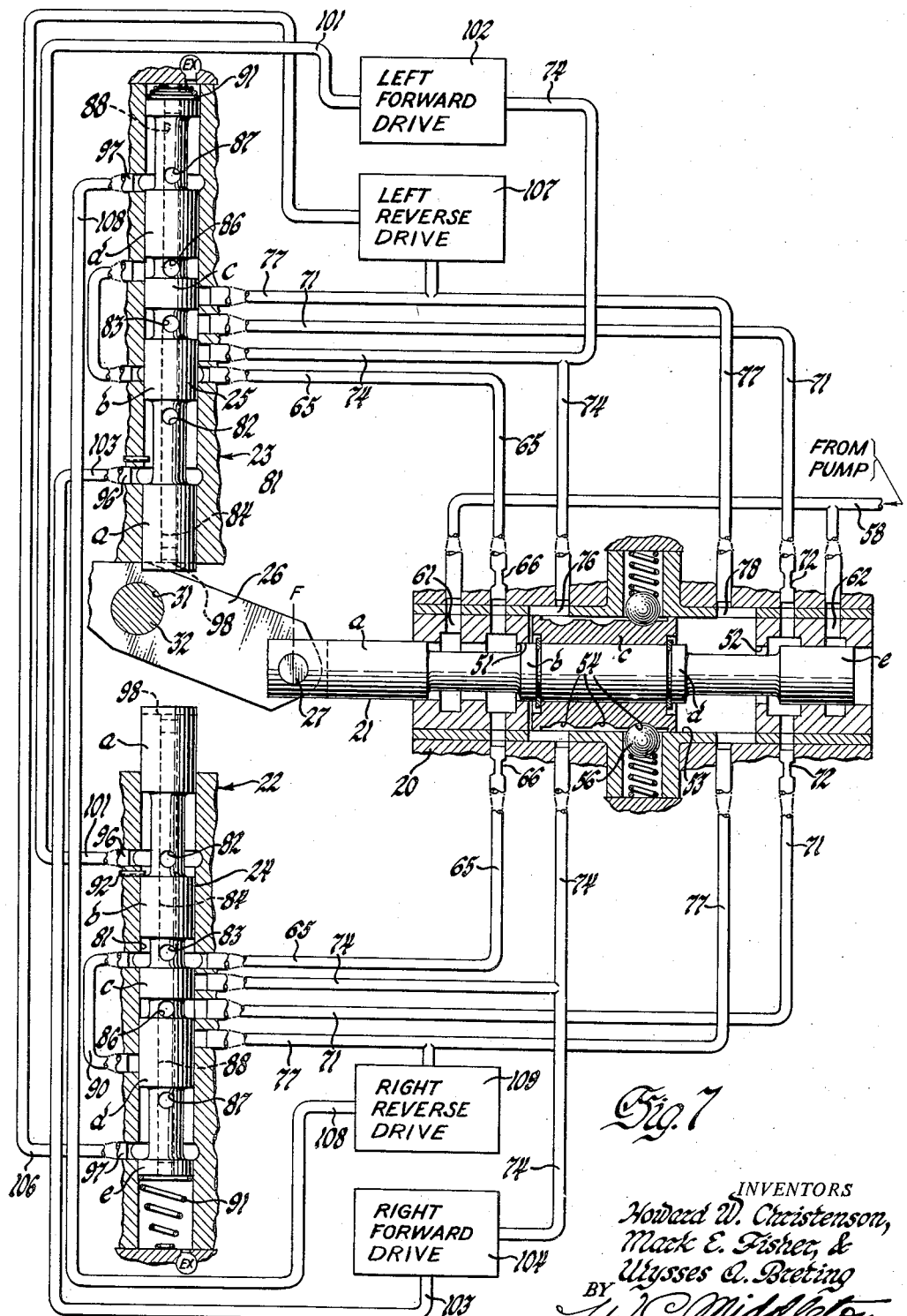

United States Patent Office 2,969,695
Patented Jan. 31, 1961

2,969,695

TRANSMISSION

Howard W. Christenson, Indianapolis, Mark E. Fisher, Carmel, and Ulysses A. Breting, Indianapolis, Ind., assignors to General Motors Corporation, Detroit, Mich., a corporation of Delaware Filed July 1, 1958, Ser. No. 746,035

11 Claims. (Cl. 74—710.5)

This invention relates to a transmission and more particularly to a hydraulic control system for a cross drive transmission.

The cross drive transmission is more specifically shown in the assignee's co-pending application Serial No. 631,202, filed December 28, 1956, by Ulysses A. Breting, and entitled "Transmission." The cross drive transmission has a suitable multiratio transmission unit connecting the engine to the cross drive shaft. The cross drive shaft is connected at the right side by a right forward and reverse gear unit to the right-hand drive device such as the track and at the left side by the left forward and reverse gear unit to the left drive device. The forward and reverse gear units are hydraulically actuated to establish either forward or reverse drive. A single lever control is arranged to actuate a forward and reverse valve and a right and left-hand steer valve in order to provide a neutral and a forward and reverse straight drive position and steering. Right and left steering is provided in both forward and reverse operation, in a first range providing moderate steering and in a second range providing sharp or pivot steering. In the moderate steer range the drive on one side of the vehicle is maintained while the drive gearing on the other side is placed in neutral and the brakes may be employed selectively to control the steering. In the sharp steer range the drive from one side is again maintained while the drive on the other side is changed to a drive in the opposite direction.

In the control system a single lever actuates a cam which in response to forward and reverse movement of the lever moves the forward and reverse valve from neutral respectively to forward and reverse positions to connect the pressure source to the forward and reverse apply and cooling lines respectively. These lines are connected to the right and left-hand steering valves. Lateral movement of the single lever actuates the cam to selectively move either the right or left-hand steering valve from the straight drive position to either the moderate or sharp steer positions to control the operation of the cross drive gearing and the lubrication and the cooling of the ratio establishing friction devices to control the steering.

An object of the invention is to provide in a cross drive transmission unit having right and left-hand forward and reverse drives a control arrangement providing straight drive, a moderate steer and a sharp or pivot steer.

Another object of the invention is to provide in a cross drive transmission unit having right and left-hand forward and reverse drive units a single lever control system to control the actuation of the gear unit to provide straight drive in either forward or reverse drive by engaging either the forward or reverse drive, a moderate steer drive in either direction by selectively disengaging the drive of the right or left gear unit, and a sharp or pivot steer by selectively disengaging the drive then effective and engaging the drive in the opposite direction in the right or left gear unit, while maintaining the drive of the other of the right and left gear units.

Another object of the invention is to provide in a cross drive transmission unit a single lever control providing a straight drive, a moderate steer drive by disengaging one drive and a sharp steer drive by disengaging one drive and establishing drive on that side of the vehicle in the opposite direction by progressive movement to the right or left of the straight drive positions.

Another object of the invention is to provide in a cross drive and steer transmission a control system having a forward and reverse valve, a right and left steer valve, a cam controlling the three valves to actuate the forward and reverse valve to provide forward or reverse drive with the steering valve in the straight drive position and to selectively actuate the right and left steering valves to provide during either forward or reverse drive right or left-hand steering in a first or moderate range and in a second or sharp steering range.

These and other objects of the invention will be more apparent from the following description and drawings showing a preferred embodiment of the invention.

Fig. 5 is a hydraulic schematic view showing the control system in neutral.

Fig. 6 is a hydraulic schematic view of the control system in forward drive moderate turn.

Fig. 7 is a schematic view of the control system in forward drive sharp right turn.

Figure 1:
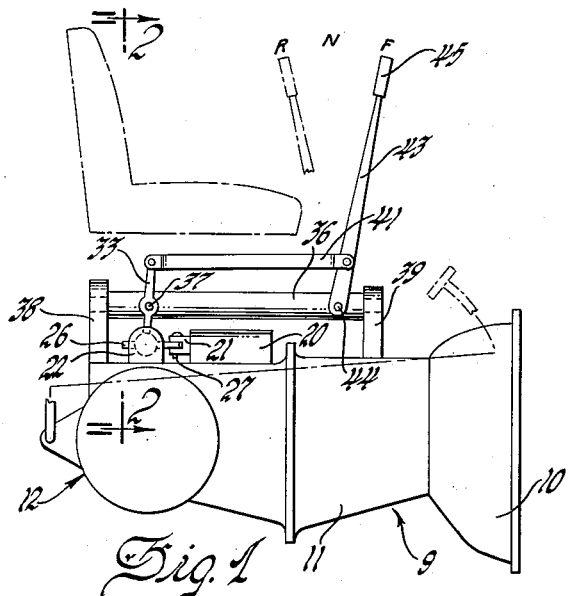
Fig. 1 is a diagrammatic showing of the transmission and the control linkage for operating the valves.
Figure 3:
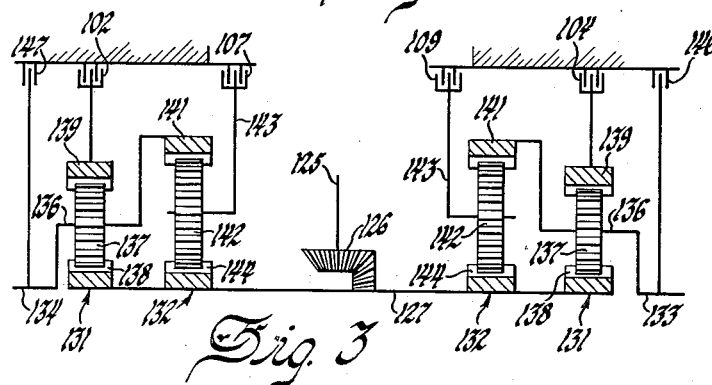
Fig. 3 is a diagrammatic view of the gearing.

This invention as illustrated may be used in connection with a transmission having a torque converter 10 and ratio gear unit 11 connecting the engine shaft to the cross drive shaft as disclosed in the above-mentioned application Serial No. 631,202. The cross drive transmission unit 12 has a right and left-hand gear unit as shown in Fig. 3.

The multiratio transmission unit, which may include a torque converter and gearing, has an output shaft 125 connected by bevel gearing 126 to the cross drive transmission shaft 127. The cross drive shaft 127 has right and left-hand drive units, each having a forward planetary gear set 131 and a reverse planetary gear set 132 connected respectively to drive the right-hand output shaft 133 and left-hand output shaft 134. Each of the output shafts is connected to a carrier 136 of the forward planetary gear set which has pinions 137 meshing with the sun gear 138 driven by the cross drive shaft and a ring gear 139 which may be retarded by a forward drive device 104 to establish forward drive. The output or forward carrier 136 is also connected to the reverse ring gear 141 which meshes with the planetary pinions 142 of the reverse carrier 143. The reverse sun gear 144 is driven by the cross drive shaft 127. When the reverse drive device 109 is engaged to hold the carrier 143, the output shaft 133 is driven in a reverse direction. The left-hand forward drive device 102 and a left-hand reverse drive device 107 similarly actuates the left-hand gear unit to establish respectively forward and reverse drive. The right-hand output shaft 133 and the left-hand output shaft 134 may also be retarded respectively by the right and left brake devices 146 and 147. The forward and reverse drive devices and brake devices may consist of a multiplate friction unit which is engaged by a fluid motor.

The forward and reverse valve 20 having a movable valve element 21 is mounted on top of the transmission unit and extends in a longitudinal direction while the right-hand steer valve 22 and the left-hand steer valve 23, having valve elements 24 and 25 respectively, are mounted transversely on their respective sides of the transmission cross drive housing to control the supply of fluid from a source to the forward and reverse ratio engaging devices.

These three valves are actuated by a cam 26 pivotally secured by a pin 27 to the forward and reverse valve element 21 and engaging the right and left steer valve elements 24 and 25 respectively. The cam has a central aperture 31 which receives the ball 32 located on the end of the repeating lever 33. Repeating lever 33 has a central bifurcated portion 34 surrounding the shaft 36 and is pivotally secured thereto by the pin 37. The shaft 36 extends longitudinally of the transmission above the valve 20 and is pivotally mounted on the transmission housing for rotation about its axis by the rear support 38 and the forward support 39. The upper end of the repeating lever 33 is pivotally connected to a rod 41 which is also pivotally connected at an intermediate point to the hand lever 43. The hand lever has a bifurcated portion pivoted by pin 44 to the shaft 36. It will be seen that movement of the hand lever is repeated through this linkage and repeating lever 33 at the ball 32 provides a mirror image of the motion at handle 45.

Figure 4:
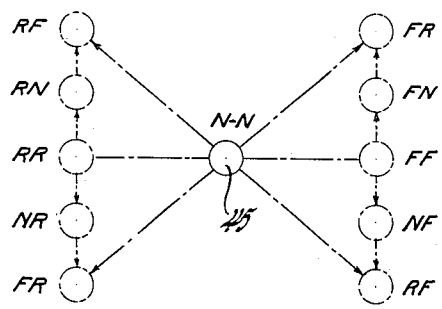
Fig. 4 is a diagram illustrating the control positions of the single controlled lever.
Figure 2:
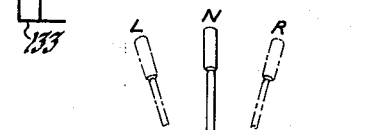
Fig. 2 is a partial sectional view along the line 2—2 showing the valve operating linkage.

Figure 4 illustrates the various control positions of the handle 45 and indicates drive effective respectively in the right-hand and the left-hand gear unit in each control position. Thus, the handle 45 when moved directly forward to the FF position places both the right-hand and left-hand gear units in forward drive and the vehicle will move straight ahead. If the handle is moved to the right to the NF position the vehicle will turn moderately to the right with the right gear unit in neutral and the left gear unit in forward. Further movement of the handle 45 to the right to the RF position will place the right-hand gear unit in reverse and the left-hand gear unit in forward drive to provide a sharp or pivot right turn. Similarly moving the hand lever from the NN position in which both gear units are in neutral to the RR position places both gear units in reverse to establish reverse drive. Similar movement to the right or left establishes moderate or sharp steering.

The forward reverse valve 20 (Fig. 5) has a valve element 21 having lands $a$, $b$, $d$ and $e$ of small diameter and a large central land and $c$. The lands $a$ and $b$ cooperate with a small bore 51 at the forward end of the valve and lands $d$ and $e$ with small bore 52 at the reverse end of the valve. The large diameter bore 53 at the center of the valve cooperates with land $c$. The land $c$ has three annular grooves 54 which cooperate with the spring biased ball detent 56 to retain the valve in the neutral and forward reverse positions. The main line 58 from a suitable regulated source of pressure is connected to the ports 61 and 62 at the opposite ends of the valve which are closed by the lands $a$ and $b$ respectively with the valve in the neutral position shown in Fig. 5. The forward supply line 65 is connected through an orifice 66 to the bore 51 between the lands $a$ and $b$ with the valve in the netural position. The reverse supply line 71 is connected through an orifice 72 to the bore 52 between the lands $d$ and $e$ with the valve in the neutral position. The forward lubricating line 74 is connected to an elongated port 76 while the reverse lubricating line 77 is connected to the large port 78 both in the large bore 53. When the valve is in the neutral position the ports 76 and 78 extend from land $c$ to the step between the large bore 53 and the adjacent small bores 51 and 52 respectively.

When the valve element 21 of the forward and reverse valve 20 is initially moved from the neutral toward the forward position the land $a$ first uncovers the inlet port 61 to vent fluid to both the forward supply line 65 and the forward lubricating lines 74. Since the lubricating lines 74 merely supply fluid to the friction engaging devices, and thus operate as vents, the pressure in the forward supply line 65 is initially at a low value compared to the supply line 58. However, with continued movement the land $c$ throttles the port 76 and reduces the flow to the forward lubricating lines 74 and thus gradually increases the pressure of the fluid supplied to the forward supply lines 65. Due to the unbalanced area between the lands $a$ and $c$ the operator feels through the manual control linkage the resistance to the movement of the valve element 21 proportional to the pressure in line 65 and the drive device being engaged and thus can sense the degree of engagement of the drive device. When the land $b$ enters the bore 51, the valve is in the forward position and the pressure in the drive device acting through line 65 acts on the balance areas of lands $a$ and $b$ and thus no longer exerts a pressure or force on the valve element. In all forward valve positions reverse line 71 remains connected between lands $d$ and $e$ to reverse lubricating line 77. Movement of the valve element 21 to reverse position similarly connects main line pressure via ports 62 to the reverse supply line 71 and the reverse lubricating line 77 and provides a feel on the manual control handle 45 proportional to the pressure in line 71 delivered to reverse drive device being engaged. When land $d$ enters the bore 52, the fluid flow to the lubricating line 77 is terminated, and the feel also is terminated. In all reverse positions forward line 65 remains connected to forward lubricating line 74.

Since the construction of the right and left-hand steer valves 22 and 23 and their elements 24 and 25 is identical, the following description and reference numerals apply to both valves. The valve elements 24 and 25 have lands $a$, $b$, $c$, $d$ and $e$ of equal diameter located in a bore 81. The port 82 located between the lands $a$ and $b$ and the port 83 located between the lands $b$ and $c$ are connected by a bore 84. The port 86 between the lands $c$ and $d$ and the port 87 between the lands $d$ and $e$ are connected by a bore 88. With the valve elements in the straight drive position shown in Fig. 5 a spring 91 located in the vented end of the bore acts on land $e$ to hold the land $b$ against a stop pin 92. With the valve in this position the forward apply port 96 is located between the lands $a$ and $b$ adjacent the land $b$. The forward supply line 65 is connected to bore 81 between the lands $b$ and $c$. The forward lubricating line 74 is blocked by land $c$. The reverse apply line 71 is connected to the bore 81 between the lands $c$ and $d$ and the reverse lubricating line 77 is blocked by the portion of land $d$ adjacent the land $c$. The forward supply line 65 has a branch 90 connected to bore 81 and blocked by the portion of land $d$ adjacent land $e$. The reverse port 97 is located between the lands $d$ and $e$ adjacent the land $e$. A slot 98 in the end of land $a$ cooperates with cam 26.

The forward supply lines 65 are each connected through an orifice 66 to the right-hand valve 22 and the left-hand valve 23. The forward apply port 96 of the right-hand valve 22 is connected via the left forward apply line 101 to the left forward drive device 102. The forward apply port 96 of the left steer valve 23 is connected by right forward apply line 103 to the right forward drive device 104. The forward lubricating lines 74 are connected to both the right and left forward drive devices 102 and 104 to lubricate and cool the friction engaging devices therein and thus at all times provide an exhaust to the sump. The branches of lines 74 are connected to the right and left steer valves. The reverse supply lines 71 are similarly connected through orifices 72 to the right and left steer valves 22 and 23. The reverse supply port 97 of the right steer valve 22 is connected by left reverse apply line 106 to the left reverse drive device 107. The reverse supply port 97 of the left steer valve 23 is connected by right reverse apply line 108 to the right reverse drive device 109. The reverse cooling lines 77 are connected to the right and left reverse drive units to supply fluid to lubricate and cool the unit and provide an exhaust at all times. The branches of lines 77 are connected to the right and left steer valve.

When the control lever handle 45 is in the neutral position the valves are in the position shown in Figure 5. With the forward and reverse valve 20 in neutral the lands a and e block the main line or supply ports 61 and 62 so that no fluid is supplied to the control system and both the right and left forward and reverse drive units are in neutral.

When the hand lever 45 is shifted to the straight forward drive position FF the forward and reverse valve 20 is shifted to the position shown in Figure 6 to initially supply fluid to both the forward supply line 65 and forward lubricating line 74. The steer valves 22 and 23 remain in the straight drive position shown in Fig. 5 in which the forward supply line 65 is connected by right steer valve 22 between the lands b and c, bore 84, between the lands a and b to the forward supply port 96 and line 101 to engage the left forward drive device 102. The forward supply line 65 is similarly connected by left steer valve 23 to the apply port 96 and line 103 to engage the right forward drive device 104. With both forward drive devices engaged the vehicle will move straight forward. During this movement of the forward reverse valve 20 to engage the drive device fluid is also supplied to the forward lubricating line 74 which is connected to the right and the left forward drive devices 102 and 104 to lubricate the friction engaging devices during engagement. It will be noted that the branch lubricating line 74 is blocked at the steering valve by land c so that all the fluid in line 74 flows to lubricate the forward drive engaging devices. At this time the right and left reverse drive devices are disengaged. Right reverse apply line 108 is exhausted via port 97, the space between the lands d and e of the left steer valve 23, the bore 88, the space between the lands c and d, the reverse apply line 71 and the reverse lubricating line 77. The left reverse apply line 106 is similarly connected by the right steer valve 22 and forward and reverse valve 20 to the reverse lubricating line 77 which acts as an exhaust.

For right moderate turning during forward drive the handle 45 is moved to the NF position in which the right forward drive device is placed in neutral and the left forward drive device remains engaged. The degree of turning may be regulated by manual application of the right vehicle brake 146. In all forward drives the main line 58 continues to be connected by forward reverse valve 20 to the forward apply line 65. The position of the right steer valve 22 also remains unchanged, connecting line 65 to line 101 to engage the left forward drive device. The left reverse drive device also remains exhausted and thus disengaged as in straight forward drive. The left steer valve 23 is moved to the position shown in Fig. 6 blocking the forward supply line 65 to prevent engagement of the right forward or reverse drive devices. The right forward drive device is disengaged since it is connected to exhaust via line 103 and port 96 to valve 23, which provides a connection via bore 84 to line 74. Line 74, which is connected to sump at the left forward device, provides an exhaust. The right reverse drive device 109 is exhausted via line 108, the left steer valve bore 88 and reverse cooling line 77. Thus, disengagement of the right forward device places the right drive unit in neutral and provides a medium forward turn.

Further movement of the hand lever to the right to the right sharp turn position RF moves the left steer valve to engage the right reverse drive and continues engagement of the left forward drive for a pivoted turn. With the valve 23 in the sharp turn position, as shown in Fig. 7, the forward supply line 65 is connected around the land b of left steer valve element 25 to the line 90 and between the lands c and d, through the bore 88, and the space between the lands d and e, to the reverse supply port 97, and line 108 to engage the right reverse drive device 109. The right forward drive device 104 is vented via line 103, port 96 and bore 84 of the left steer valve 23, line 71, the forward and reverse valve 20, and lubricating line 77 to exhaust at the reverse drive devices.

Movement of the hand lever 45 to the FN position will similarly provide left medium steer in which the right drive unit is in forward drive and the left unit is in neutral. Further movement of the hand lever 45 to the left to the FR position will place the right drive unit in forward and the left drive unit in reverse for sharp left steer. The operation of the controls is similar to the operation for right steer except that the right-hand steering valve 22 is actuated by the control lever.

In reverse drive the forward and reverse valve 20 is moved forwardly from a neutral position shown in Fig. 5 to connect the main line 58 initially to both the reverse supply lines 71 and the reverse lubricating line 77 and then to the reverse supply line 71 only. The right and left steer valves 22 and 23 respectively are moved in the same sequence of positions in order to steer the vehicle during reverse drive in the same way as the vehicle is steered in forward drive. In reverse drive straight reverse is provided when the hand lever 45 is moved to the RR position. Both steer valves are in the same position shown in Fig. 5, connecting the reverse supply line 71 via the bore 88 of the right-hand steer valve 22 to the left reverse line 106 to engage the left reverse drive 107 and via the left-hand steer valve 23 in the same way to the right-hand reverse supply line 108 to engage the right reverse drive device 109. The right and left forward drive devices 104 and 102 are vented through their respective lines 103 and 101, steer valves 23 and 22, forward supply line 65, and the forward reverse valve 20 to the forward lubricating line 74. The reverse lubricating lines 77 are blocked at both the right and left steering valves so that all the flow passes to lubricate the right and left reverse drive devices 104 and 107.

For reverse moderate or medium right turn drive the forward reverse valve 20 remains in the reverse position and the left steer valve 23 is moved to the position shown in Fig. 6. In this position the reverse supply line 71 is blocked by land c of left steer valve element 24 to cut off flow to the right reverse drive device 109 which is exhausted via line 108, bore 88 of the left steer valve 23 and the reverse lubricating line 77 which exhausts at the reverse drive devices.

For a sharp right turn in reverse drive, hand lever 45 is moved to the FR position (Fig. 4). The forward reverse valve 20 remains in the reverse position and the left steer valve 23 is moved to the sharp right turn position shown in Fig. 7. In this position reverse supply line 71 is connected by bore 84 of the left steer valve 23 to the port 96 and the right forward supply line 103 to engage the right forward drive 104. The right reverse drive is vented via line 108 to bore 88, line 90 of the left steer valve 23 and via line 65 and forward reverse valve 20 to the vented lubricating line 74. The left forward drive remains disengaged as explained above. Thus, with left reverse drive and right forward drive engaged, a right pivot turn is made.

In reverse drive left-hand turns are made by moving the handle 45 to the left to the RN position for moderate turn and to the RF position for a sharp turn.

The brakes 146 and 147 may be manually or automatically controlled to assist or control turning in the moderate turning range.

The above described preferred embodiment is illustrative of the invention which may be modified by those skilled in the art within the scope of the appended claims.

We claim:
1. In a transmission, an input shaft, a right and a left drive unit each providing neutral, forward and reverse drive, respectively disconnecting or connecting said input shaft to drive a right output shaft and a left output shaft in either forward or reverse drive, a single lever control movable longitudinally from a neutral postion in opposite directions to a forward and a reverse position and movable laterally to the right or left to a medium and a sharp steer position, control means including main control means to control said right and left drive units simultaneously and right and left steer control means to selectively control said right and left drive units, and means connecting said single lever control to said main control means to move said main control to establish neutral, forward, or reverse drive in the respective positions of said main control means and to said right and left steer control means to overcontrol the right or left drive unit on lateral movement to the right or left and to disengage one drive on movement to said medium turn position and to establish the opposite drive on movement to said sharp turn position.

2. In a transmission, an input shaft, a right and a left drive unit each providing neutral, and having friction means establishing forward and reverse drive, respectively disconnecting or connecting said input shaft to drive a right output shaft and a left output shaft in either forward or reverse drive, a source of fluid, a single lever control movable longitudinally from a neutral position in opposite directions to a forward and a reverse position and movable laterally to the right or left to a medium and a sharp steer position, control means including main control means to establish said forward and reverse drives in said right and left drive units simultaneously and to connect said source to said friction means of the drive unit being engaged to cool said friction means, and right and left steer control means to selectively control said right and left drive units, means connecting said single lever control to said main control means to move said main control to establish neutral, forward, or reverse drive in the respective positions of said main control means and to said right and left steer control means to overcontrol the right or left drive unit on movement to the right or left and to disengage one drive on movement to said medium turn position and to establish the opposite drive on movement to said sharp turn position.

3. In a transmission, an input shaft, a right and a left drive unit each providing neutral, forward and reverse drive, respectively disconnecting or connecting said input shaft to drive a right output shaft and a left output shaft in either forward or reverse drive, a single lever control movable longitudinally from a neutral position in opposite directions to a forward and a reverse position and movable laterally to the right or left to a medium and movable further to the right or left to a sharp steer position, control means including main control means to control said right and left drive units simultaneously movable longitudinally from a neutral position in opposite directions to a forward or a reverse position, a right and a left steer control means to selectively modify the control exercised by said main control means on said right and left drive units, respectively a cam connecting said single lever control to said main control means to move said main control to neutral, forward, or reverse drive positions in the respective positions of said single lever control and to selectively actuate said right and left steer control means to overcontrol the main control means control of the right or left drive unit on movement respectively to the right or left and to disengage one drive on movement to said medium turn position and to establish the opposite drive on movement to said sharp turn position.

4. In a transmission, an input shaft, a right and a left drive unit each having a fluid actuated forward drive device and a fluid actuated reverse drive device respectively connecting said input shaft to drive a right output shaft and a left output shaft in either forward or reverse drive, a source of fluid under pressure, a forward and reverse valve, a right and a left steer valve each having a forward and a reverse supply port, said forward and reverse valve having a forward position connecting said source to said forward supply port of said right and left steer valves and a reverse position connecting said source to said reverse supply port of said right and left steer valves and a neutral position connecting said forward and reverse supply ports to exhaust, said steer valves having a first position connecting said forward and reverse supply ports respectively to said forward and reverse drive devices, said steer valves having a second position blocking the flow from said forward and reverse supply ports to both said forward and reverse drive devices, and said steer valves having a third position connecting said forward and reverse supply ports respectively to said reverse and forward drive devices and a single lever actuating control means to selectively move said forward reverse valve from said neutral position to said forward and reverse positions and to selectively actuate either one of said steer valves to move it from said first position to said second and third positions while maintaining the other steer valves in said first position.

5. In a transmission, an input shaft, a right and a left drive unit each having a fluid actuated forward drive device and a reverse fluid actuated drive device respectively connecting said input shaft to drive a right output shaft and a left output shaft in either forward or reverse drive, a source of fluid under pressure, a forward and reverse valve, a right and a left steer valve each having a forward and a reverse supply port, said forward and reverse valve having a forward position connecting said source to said forward supply port of said right and left steer valves and a reverse position connecting said source to said reverse supply port of said right and left steer valves and a neutral position connecting said forward and reverse supply ports to exhaust, said steer valves having a first position connecting said forward and reverse supply ports respectively to said forward and reverse drive devices, said steer valves having a second position blocking the flow from said forward and reverse supply ports to both said forward and reverse drive devices, and said steer valves having a third position connecting said forward and reverse supply ports respectively to said reverse and forward drive devices and a single lever movable forwardly and reversely to actuate control means to move said forward reverse valve from said neutral position respectively to said forward and reverse position and said single lever on movement to the right or left to selectively actuate one of said steer valves to move it from said first position to said second and third positions while maintaining the other steer valves in said first position to respectively actuate the right or left drive unit to effect respectively right or left steering.

6. In a transmission, an input shaft, a right and a left drive unit each having a fluid actuated forward drive device and a reverse fluid actuated drive device respectively connecting said input shaft to drive a right output shaft and a left output shaft in either forward or reverse drive, a source of fluid under pressure, a forward and reverse valve, a right and a left steer valve each having a forward and a reverse supply port, said forward and reverse valve having a forward position connecting said source to said forward supply port of said right and left steer valves and a reverse position connecting said source to said reverse supply port of said right and left steer valves and a neutral position connecting said forward and reverse supply ports to exhaust, said steer valves having a first position connecting said forward and reverse supply ports respectively to said forward and reverse drive devices, said steer valves having a second position blocking the flow from said forward and reverse supply ports to both said forward and reverse drive devices, and said steer valves having a third position connecting said forward and reverse supply ports respectively to said reverse and forward drive devices and a single lever actuating a cam to selectively move said forward reverse valve from said neutral position to said forward and reverse positions and to selectively actuate either one of said steer valves to move it from said first position to said second and third positions while maintaining the other steer valves in said first position.

7. In a transmission, an input shaft, a right and a left drive unit each having a fluid actuated forward drive device and a fluid actuated reverse drive device respectively connecting said input shaft to drive a right output shaft and a left output shaft in either forward or reverse drive, a source of fluid under pressure, forward and reverse valve means, right steer valve means and left steer valve means each having a forward and a reverse supply port, said forward and reverse valve means having a forward position connecting said source to said forward supply port of said right steer valve means and of said left steer valve means and a reverse position connecting said source to said reverse supply port of said right steer valve means and of said left steer valve means and a neutral position connecting said forward and reverse supply ports to exhaust, each of said steer valve means having a first position connecting said forward and reverse supply ports respectively to said forward and reverse drive devices, each of said steer valve means having a second position blocking the flow from said forward and reverse supply ports to both said forward and reverse drive devices, each of said steer valve means having a third position connecting said forward and reverse supply ports respectively to said reverse and forward drive devices and control means to selectively move said forward and reverse valve from said neutral position to said forward and reverse positions and to selectively actuate either one of said steer valve means to move it from said first position to said second position and third position while maintaining the other steer valve means in said first position.

8. In a transmission, an input shaft, a right and a left drive unit each having a fluid actuated first drive device and a fluid actuated second drive device respectively connecting said input shaft to drive a right output shaft and a left output shaft respectively in a first and a second drive, a source of fluid under pressure, drive valve means, a right steer valve means and a left steer valve means, a first drive line and a second drive line, said drive valve means having first drive and a second drive position connecting said source respectively through said first drive line and said second drive line to each of said right and left steer valve means, said steer valve means each having a first position providing a connection from said first drive line and said second drive line respectively to said first and second drive devices, said steer valve means each having a second position blocking the flow to both said first and second drive devices, and said steer valve means each having a third position providing an opposite connection from said first and second drive lines to said second and first drive devices and control means to selectively move said drive valve means to said first drive and second drive positions and to selectively actuate one of said steer valve means to move it from said first position to said second and third positions while maintaining the other steer valve means in said first position.

9. In a transmission, an input shaft, a right and a left drive unit each having a fluid actuated first drive device and a fluid actuated second drive device respectively connecting said input shaft to drive a right output shaft and a left output shaft respectively in a first and a second drive, a source of fluid under pressure, drive valve means, a right steer valve means and a left steer valve means, a first drive line and a second drive line, said drive valve means having first drive and a second drive position connecting said source respectively through said first drive line and said second drive line to each of said right and left steer valve means, said steer valve means each having a first position providing a connection from said first drive line and said second drive line respectively to said first and second drive devices, and said steer valve means each having a second position providing a connection from said first drive line to said second drive device and control means to selectively move said drive valve means to said first drive and second drive positions and to selectively actuate one of said steer valve means to move it from said first position to said second and third positions while maintaining the other steer valve means in said first position.

10. In a transmission, an input shaft, a right and a left drive unit each providing neutral, forward and reverse drive, respectively disconnecting or connecting said input shaft to drive a right output shaft and a left output shaft in either forward or reverse drive, a single lever control movable longitudinally from a neutral position in opposite directions to a forward and a reverse position and movable laterally to the right or left to a steer position, control means including main control means to control said right and left drive units simultaneously and right and left steer control means to selectively control said right and left drive units, and means connecting said single lever control to said main control means to move said main control to establish neutral, forward, or reverse drive in the respective positions of said main control means and to said right and left steer control means to overcontrol the right or left drive unit on lateral movement to the right or left and to disengage one drive and to establish the opposite drive on movement to said steer position.

11. In a transmission; an input shaft; a right and a left output shaft; a right and a left drive unit each connecting said input shaft respectively to said right and left output shaft and each providing neutral, disconnecting said input shaft from one output shaft, a first drive connecting said input shaft to one output shaft in a first drive connection and a second drive connecting said input shaft to one output shaft in a second drive connection; a single lever control movable longitudinally from a neutral position to a first and a second position and movable laterally from a straight drive position to the right or left to a medium and a sharp steer position; control means including main control means having a neutral, a first and a second position to control said right and left drive units simultaneously and right and left steer control means having straight drive, steer position to selectively control said right and left drive units to respectively engage said first drive and to disengage said first drive connection and engage said second drive connection; and means connecting said single lever control to said main control means to move said main control and hold said right and left steer control means in straight drive position to actuate said control means to establish neutral, said first drive connection, and said second drive connection in the respective positions of said main control means in response to longitudinal movement of said single lever control to said neutral, first and second positions and connecting said single lever control to said right and left steer control means to overcontrol the right or left drive unit on lateral movement of said single lever control from said straight drive position to the right or left to disengage said first drive connection and to establish said second drive connection on movement to said turn position.

References Cited in the file of this patent
UNITED STATES PATENTS

| | | |
|---|---|---|
| 2,393,324 | Joy | Jan. 22, 1946 |
| 2,664,708 | Norelius | Jan. 5, 1954 |
| 2,714,826 | Jasper | Aug. 9, 1955 |

UNITED STATES PATENT OFFICE
CERTIFICATION OF CORRECTION

Patent No. 2,969,695                     January 31, 1961

Howard W. Christenson et al.

It is hereby certified that error appears in the above numbered patent requiring correction and that the said Letters Patent should read as corrected below.

Column 10, list of references cited, after line 69, add the following:

2,716,907 Bechman et al.------------Sept. 6, 1955

Signed and sealed this 20th day of June 1961.

(SEAL)
Attest:

ERNEST W. SWIDER
Attesting Officer

DAVID L. LADD
Commissioner of Patents